United States Patent [19]

Dibelius

[11] 4,443,153

[45] Apr. 17, 1984

[54] CONTROLLED EXHAUST-TYPE SUPERCHARGER TURBINE

[76] Inventor: Günther Dibelius, Fichthang 11, D-5100 Aachen, Fed. Rep. of Germany

[21] Appl. No.: 180,067

[22] Filed: Aug. 21, 1980

[30] Foreign Application Priority Data

Aug. 23, 1979 [DE] Fed. Rep. of Germany ....... 2934041

[51] Int. Cl.³ ...................... F01D 17/14; F01D 17/18; F02B 37/12
[52] U.S. Cl. ....................................... 415/151; 60/602; 415/205
[58] Field of Search ................. 60/600, 601, 602, 603; 415/148, 151, 155, 205

[56] References Cited

U.S. PATENT DOCUMENTS

| | | | |
|---|---|---|---|
| 3,270,495 | 9/1966 | Connor | 60/602 |
| 3,557,549 | 1/1971 | Webster | 60/602 |
| 3,614,259 | 10/1971 | Neff | 60/602 X |
| 4,008,572 | 2/1977 | Woollenweber | 60/602 |
| 4,177,006 | 12/1979 | Nancarrow | 60/602 X |
| 4,351,154 | 9/1982 | Richter | 415/205 X |

*Primary Examiner*—Michael Koczo
*Attorney, Agent, or Firm*—Allison C. Collard; Thomas M. Galgano

[57] ABSTRACT

A controlled exhaust driven turbo-supercharger is designed for an engine revolution below the nominal speed or revolutions of the engine to be supercharged and has an impellerless guidance device. A control device is provided which responds to the supercharger speed or a nominal characteristic (supercharger pressure) derived therefrom whereby the adjustment member for the control device is coupled with a control means which enlarges the flow cross section of the guidance device during the increasing supercharger speed.

3 Claims, 12 Drawing Figures

CONTROLLED EXHAUST-TYPE SUPERCHARGER TURBINE

The invention relates to a controlled exhaust driven turbo-supercharger which is designed for an engine speed below the rated speed of the motor to be supercharged and which has an impellerless guidance device.

In exhaust driven combustion engines which are driven in a wide engine revolutions range, for example, a vehicle drive, the efficiency of the system "engine-exhaust driven turbo-supercharger" is essentially defined by:

(a) the response of the revolutions moment (torque) in dependency from the engine rate of revolutions,
(b) the specific fuel consumption (g/kWh),
(c) the time dependent efficiency (reaction efficiency) of the supercharged engine.

It is desirable to obtain the highest possible increase in torque for the lowest possible fuel consumption, while lowering engine speed and while achieving a rapid engine response. Thereby, the engine speed of the turbo-supercharger and thereby the charging pressure at decreasing engine speed must drop less as if it would occur without an outside interference. The engine speed of uncontrolled exhaust driven turbo-superchargers decreases rapidly because the total enthalpy (product from the mass flow and specific total enthalpy) which is presented to the turbine from the engine also decreases with decreasing engine speed or rate of revolutions. On the other hand, the rate of revolutions or speed is limited upwardly, because the engine may not be overcharged in the operating point of its maximum capacity or output.

Controlled turbines have to be so designed that the exhaust mass flow offered by the engine is blocked below the engine rated speed or motor nominal rate of revolutions; i.e., the pressure or the specific total enthalpy flow, and thereby the turbine capacity or output be increased with respect to an uncontrolled turbine. Upon increasing the engine speed or rate of revolutions and the mass flow or current presented to the turbine, the control affects a limiting of the turbine output or capacity, i.e., it prevents an overcharging of the motor.

However, in turbine technology, controls are known with rotatable impellers with which the throughflow characteristics of the turbine is especially changed and therefore the specific total enthalpy flow and also the turbine capacity through the inlet pressure are influenced.

The required control devices are very expensive. The adjustment mechanism which operates in the range of high temperatures is not very reliable during operation. This is particularly true for small exhaust driven turbo-superchargers.

Also known is a control with a so-called "wastegate" (parallel subsidiary flow). Thereby, an overcharging of the engine is prevented in that only a portion of the exhaust mass flow flows through the engine and carries out effective work, while the remainder passes by the engine as a wastegate mass flow to the exhaust without being used. Thereby, the total energy of the wastegate mass flow remains unused.

It is therefore an object of the invention to provide a controlled exhaust driven turbo-supercharger which eliminates the disadvantages of the known system in that the total energy offered by the exhaust mass flow is used in the conversion to mechanical energy.

This object of the invention is obtained in accordance with the invention in that a control device is provided which is responsive to the supercharger speed or a nominal characteristic (supercharger pressure) derived therefrom, whose adjustment member is coupled with a control means which enlarges the flow cross section of the guidance device during the increasing supercharger speed.

Other objects and features of the present invention will become apparent from the following detailed description when taken in connection with the accompanying drawings which disclose several embodiments of the invention. It is to be understood that the drawings are designed for the purpose of illustration only and are not intended as a definition of the limits of the invention.

In the drawings, wherein similar reference characters denote similar elements throughout the several views.

Figure 1:
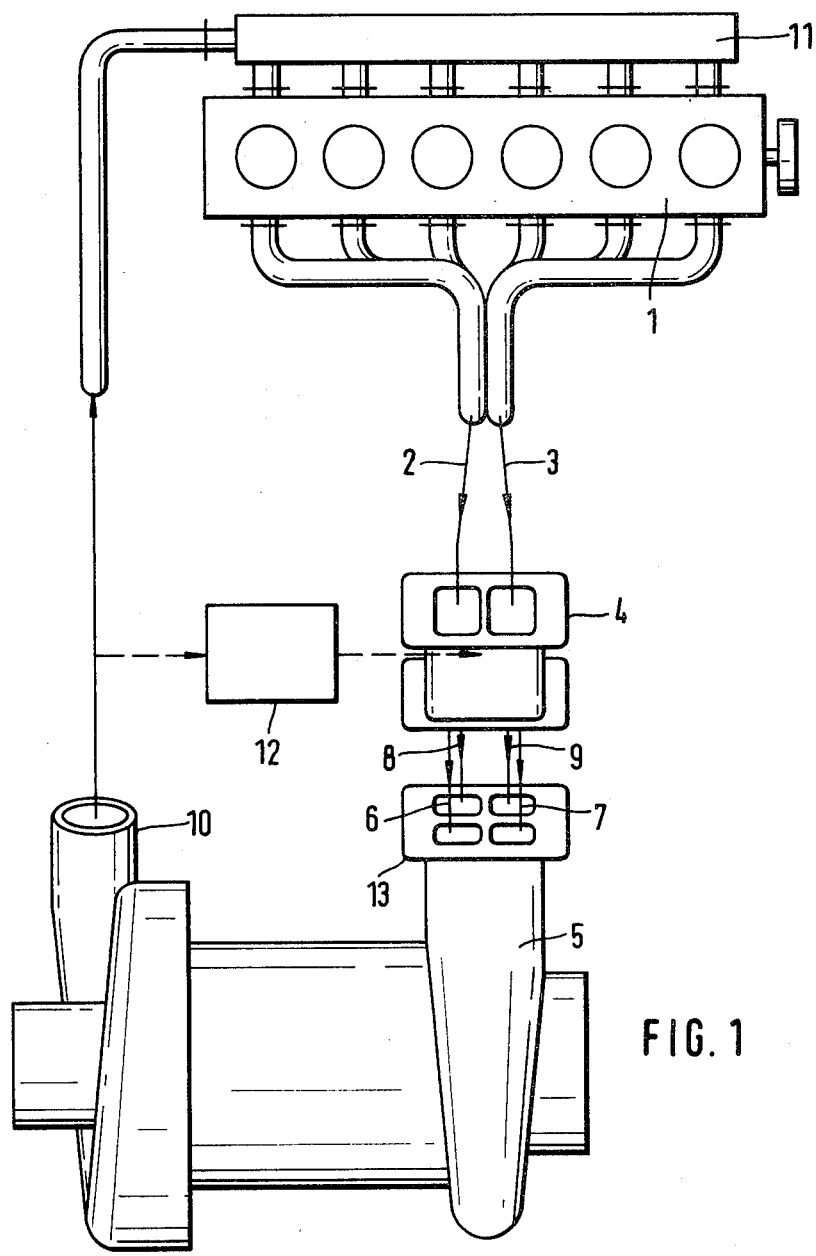
FIG. 1 is a schematically-illustrated perspective view of an exhaust driven turbo-supercharger and an engine.

Referring now in detail to the drawings, FIG. 1 shows a schematic plan view of a supercharged internal combustion engine 1 with dual exhaust flow pipes 2, 3 which lead to a control device 4. At this point, the dual exhaust flow pipes 2, 3 are separated into a plurality of exhaust flow conduits, for example, four conduits 6, 7, 8, 9, which lead to a turbo-supercharger 5. The outlet 10 on the pressure side of turbo-supercharger 5 is coupled with a charge air line or pipe 11 which leads to the cylinders of combustion engine 1.

Figure 10:
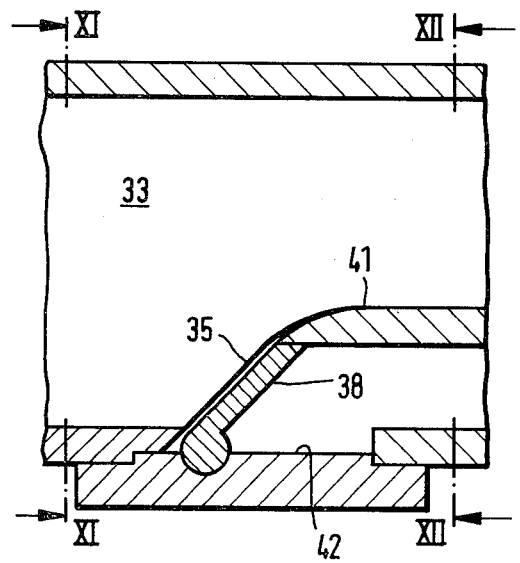
FIGS. 10–12 are cross-sectional views taken along lines X—X, XI—XI and XIII—XIII, respectively, of FIGS. 10 and 11, through a control means for the guidance device in accordance with FIG. 9.
Figure 11:
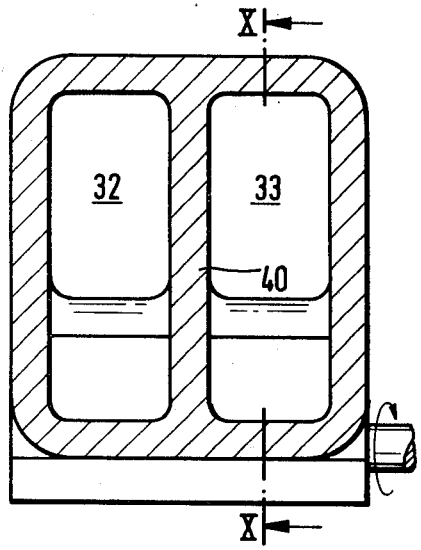
Figure 12:
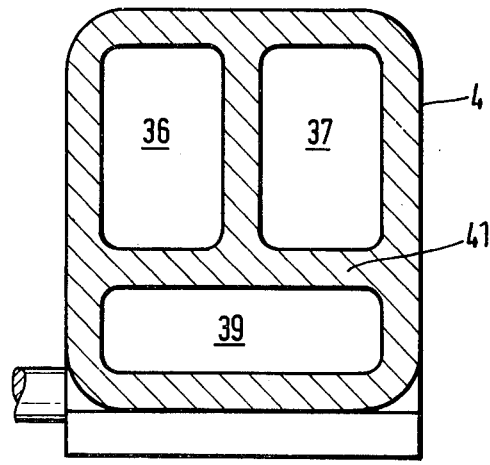

The drawing shows symbolically a control device 12, positioned between the outlet 10 and control means 4, which control device 12 includes sensing means for either the boost pressure (charging pressure) or the speed, and adjustment members to actuate either the moveable sidewalls 14 (FIG. 2) or the flap valve (FIGS. 4, 8, 10) of the control means 4. The control device with its associated adjustment member provides the connection between the compression stage (charge pressure or the nominal characteristics derived therefrom) and the control means 4.

Figure 2:
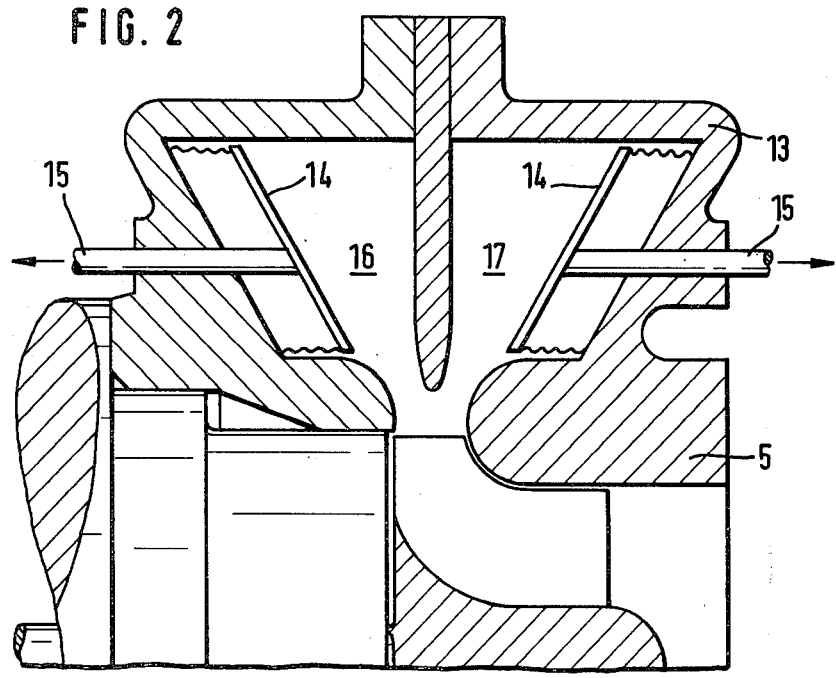
FIG. 2 is an axial longitudinal sectional view through the guidance device of a radial twin flow turbine.

FIG. 2 shows schematically an axial longitudinal view through the guidance device 13 of a radial twin streamed turbine 5 of an exhaust driven turbo-supercharger. As can be seen, the flow conduits 16, 17 of the guidance device are provided with axially moveable sidewalls 14, which are guided by suitable plungers 15 or the like. The cross sections of the flow conduits 16, 17 may be varied with these moveable sidewalls 14, whereby the intake capacity of the turbine is also varied.

When the sidewalls are moved axially outwardly from their narrowest point, the cross section of flow conduits 16, 17 is enlarged. This enlargement should be such that the common radius of the center of gravity of the flow cross section decreases or at least remains constant. This requirement results in the inclination and the positioning of sidewalls 14.

Due to such a controlled manipulation, not only is the intake capacity of the turbine increased, but also the ratio between the meridional and circumferential speed components at the rotor inlet is also varied in the same sense. Thereby, the exhaust mass flow which flows from the combustion engine is subjected to a slight flow restriction only and can therefore flow more easily into the turbine and therefore display a smaller enthalpy flow above the turbine.

The control manipulation on the turbine effects a capacity or output decrease with a simultaneous output of the total exhaust mass flow for generating the mechanical work. Thereby, the thermal degree of effectiveness (efficiency) or the specific fuel consumption, respectively, of the charged engine is improved greatly in comparison to the known wastegate controls which use only a portion of the exhaust mass energy.

Due to the low outlet pressure on the cylinders of the internal combustion engine, i.e., the low choke pressure before (in front of) the charger intake, a lower exhaust operation has to be applied in contrast to the uncontrolled engine. Therefore, a higher capacity or output on the drive shaft is available.

In other turbine models, for example, axial turbines, a corresponding control of the walls may be carried out (not illustrated).

Figure 3:
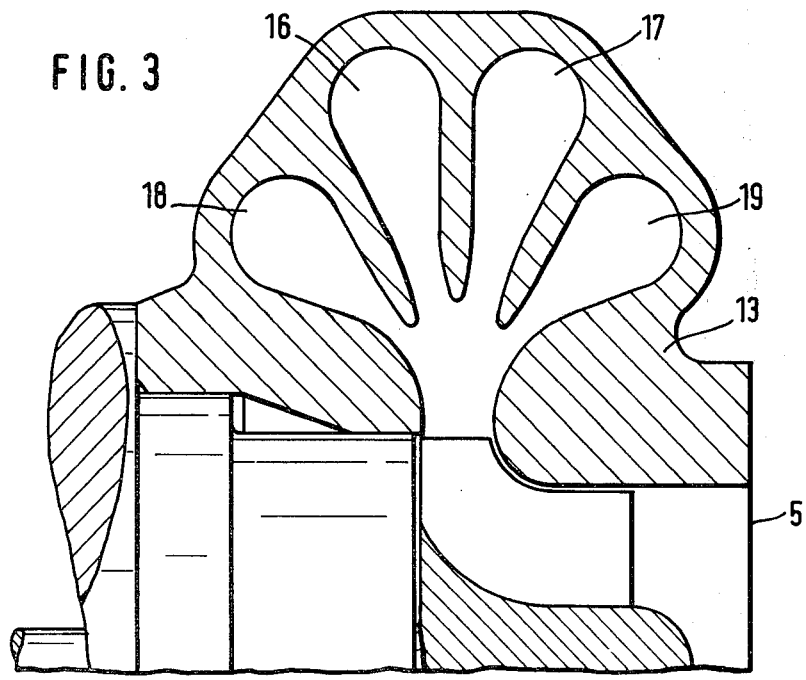
FIG. 3 is an axial longitudinal sectional view through a guidance device with two auxiliary flow conduits.

FIGS. 3-6 show another possibility for varying the flow cross sections of the turbine. As shown in FIG. 3, the guidance device 13 of turbine 5 is provided with additional flow conduits 18, 19 in addition to flow conduits 16, 17 which may be utilized totally or partially depending on the operating stage and the requirement of combustion engine 1.

The additional flow conduits 18, 19 are arranged on smaller radii than flow conduits 16, 17 and thereby fulfill the above-mentioned requirements that during a cross-sectional enlargement, a reduction of the radius of the center of the flow cross sections should occur. The cross section of these additional flow conduits must be so dimensioned that at the complete opening of the locking or shut-off elements at the nominal value of the combustion engine, the tubine capacity can only increase to a point wherein the engine 1 is not overcharged. These dimensions are to be taken from the available construction data.

Figure 4:
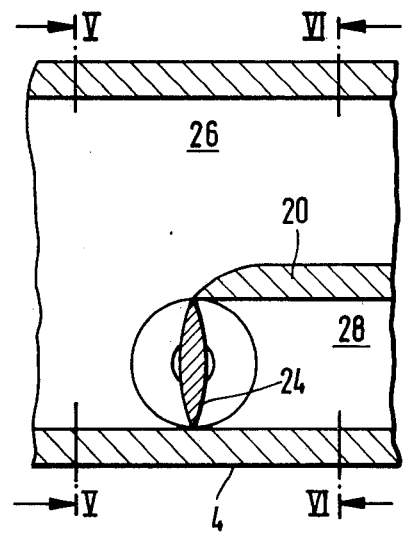
FIGS. 4–6 are cross-sectional views taken along lines IV—IV, V—V and VI—VI, respectively, of FIGS. 4 and 5, through a control means for the guidance device of FIG. 3.
Figure 5:
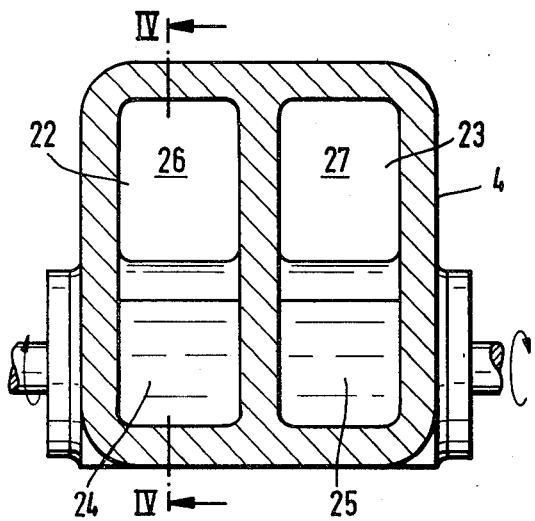
Figure 6:
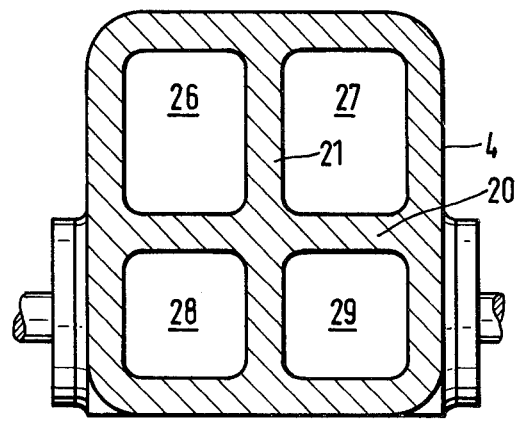

As can be seen from FIGS. 4-6, a control means is incorporated in front of flow conduits 16, 17, 18, 19, which is provided with four individual flow conduits 26, 27, 28, 29 for mass flows 6, 7, 8, 9 of FIG. 1. The flow conduits 26, 27 are associated with flow conduits 16, 17 in the guidance device of turbine 5, and are separated from flow conduits 28, 29 by means of a horizontal separating wall 20.

Throttle valves or flaps 24, 25 actuated by the control device 12 are provided at the inlet of flow conduits 28, 29 with which the flow conduits may be operated as desired. The control means is merely separated into two flow conduits 22, 23 by a vertical separating wall 21 in the range in front of throttle flaps 24, 25 and the horizontal separating wall 20 which corresponds to the exhaust flows 2, 3 of FIG. 1.

Figure 7:
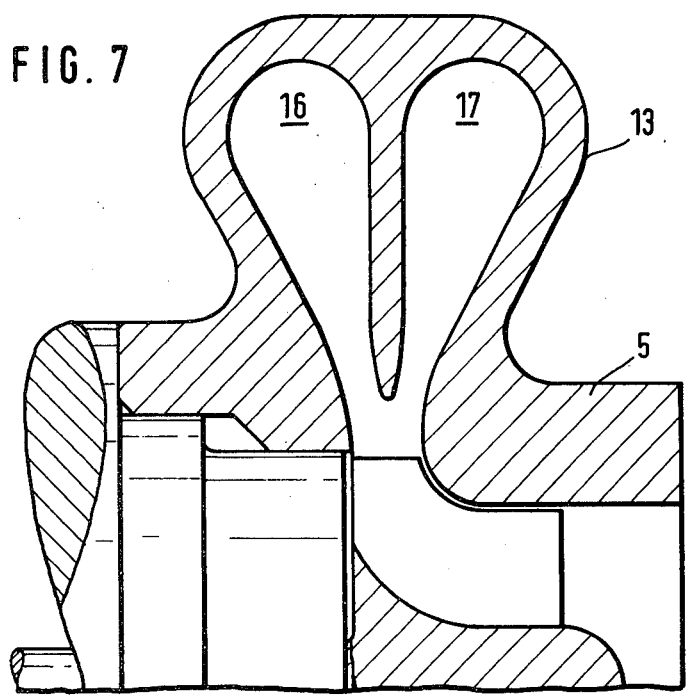
FIG. 7 is an axial longitudinal sectional view through a different guidance device.
Figure 8:
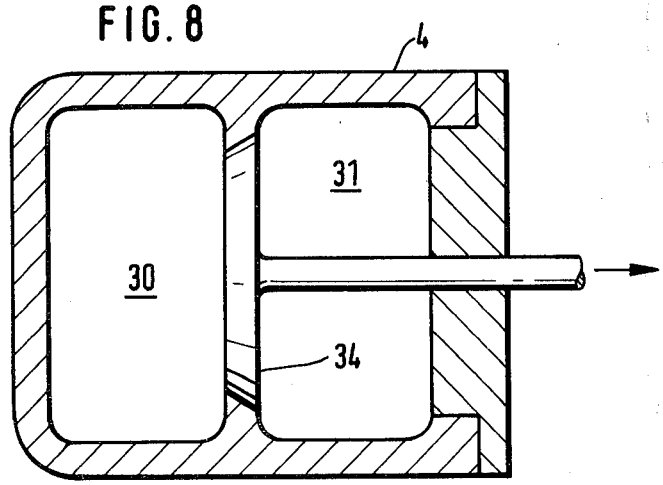
FIG. 8 is a cross-sectional view through a control means for the guidance device in accordance with FIG. 7.
Figure 9:
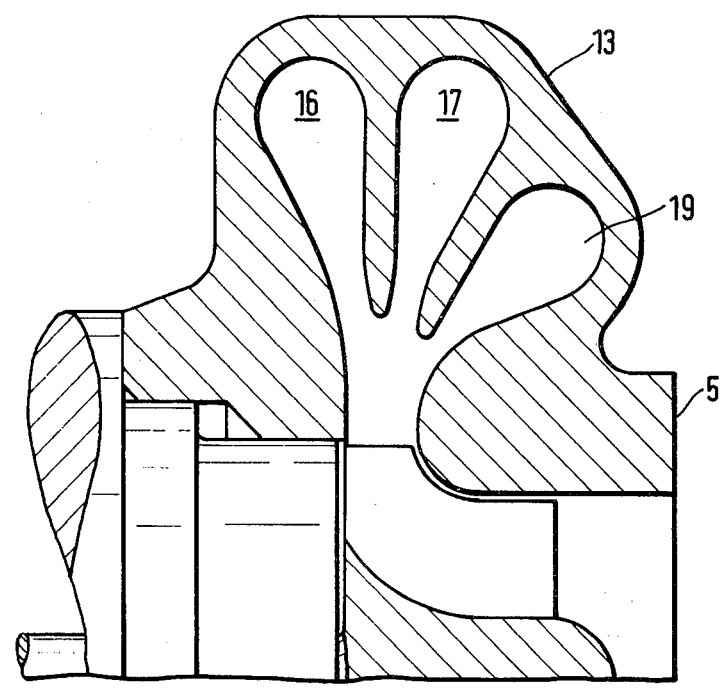
FIG. 9 is an axial longitudinal sectional view through a further guidance device.

FIGS. 7 and 8 show a different embodiment. A control means 4 is connected in front of flow conduits 16, 17 in the guidance device 13 of the turbine 5. It has two flow conduits 30, 31 which are separated by a separating wall wherein an opening closable by a valve head 34 is provided. Thereby, it is possible to more or less couple the exhaust mass flow 2, 3 of internal combustion engine 1 which, for the purpose of a thrust or inducted charging, are separated to flow through conduits 30, 31 depending on the operating stage and the requirement at an increasing engine speed with the assistance of the valve head 34 which is actuated by control device 12. Thereby, the available flow cross section in the flow conduits of the guidance device can be more effectively used and the pressure in front of the turbine may be decreased.

FIGS. 9-12 show a further embodiment wherein the principles of FIGS. 3-6 on the one hand and of FIGS. 7-8 on the other hand are combined. In accordance with FIG. 9, the guidance device 13 of turbine 5 is provided with flow conduits 16, 17 and an additional flow conduit 19 which is arranged on a smaller radius. A control means 4 is provided in front of these flow conduits 16, 17, 19 which receives the two exhaust flows 2, 3 in flow conduits 32, 33 which are separated by a vertical separating wall 40.

In the rear portion of the control means, the vertical wall 40 reaches only as far as a horizontal separating wall 41 which is mounted in the lower third so that three flow conduits 36, 37, 39 are formed instead of two flow conduits 32, 33, which are coupled to flow conduits 16, 17, 19 of guidance device 13.

Below the front end of the horizontal separating wall 41, a flap valve 38 is provided which is actuated by control device 12 and which, in its closed position, engages an oblique lower edge 35 of the vertical separating wall 40, and which, in its fully opened position, fits into a recess 42 of the housing for the control means 4.

Depending on the operating stage or state and requirement, the additional flow conduit 39 is coupled to the internal combustion engine 1, whereby an additional coupling is provided between flow conduits 32, 33 which acts jointly on flow conduit 39.

Thus, while only several embodiments of the present invention have been shown and described, it will be obvious that many changes and modifications may be made thereunto, without departing from the spirit and scope of the invention.

What is claimed is:

1. A controlled exhaust driven turbo-supercharger for an engine having exhaust flow conduits for discharging exhaust flow streams from the engine and designed for an engine speed below the rated speed of the engine to be supercharged, comprising:

a turbine having a rotor;
a vaneless, exhaust stream guidance device having at least two separate, continuously open inlet flow conduits, each of which has an inlet and an outlet, the inlets of which are each connectable to a certain exhaust stream of the exhaust flow conduits of the engine, and at least one additional flow conduit having an inlet and an outlet disposed in parallel to said inlet flow conduits, the center of the cross-sectional area of which is at a shorter radial distance from the turbine axis than the centers of the cross-section areas of said inlet flow conduits, said outlets of said inlet flow conduits as well as of said additional flow conduit surrounding the whole circumference of said turbine rotor; and control means mounted on said vaneless guidance device positioned in front of said inlet of said additional flow conduits, said control means including valve means movable between a fully opened and closed position for connecting said additional flow conduit to at least certain of said exhaust flow streams, and means for moving said valve means into its fully opened position the more the turbine speed increases, thereby connecting said additional conduit with the exhaust streams supplying said continuously open inlet flow conduits so as to increase the flow cross section.

2. The turbo-supercharger according to claim 1, wherein said control means are so arranged and configured that with the enlargement of the flow cross section of the guidance casing, the radius of the flow cross section decreases, thereby increasing the intake capacity of the turbine.

3. The turbo-supercharger according to claim 1, wherein said control means further includes a housing, and wherein said constantly open inlet flow channels and said at least one additional flow conduit are separated by a separating wall and wherein said valve means includes a flap valve mounted in said housing, said flap valve being moveable in an opening direction with increasing supercharger speed.

* * * * *